W. D. FORSYTH.
FORGED CAR TRUCK SIDE FRAME AND METHOD OF MAKING SAME.
APPLICATION FILED MAR. 28, 1914.
Reissued June 23, 1914.
13,759.
3 SHEETS—SHEET 1.
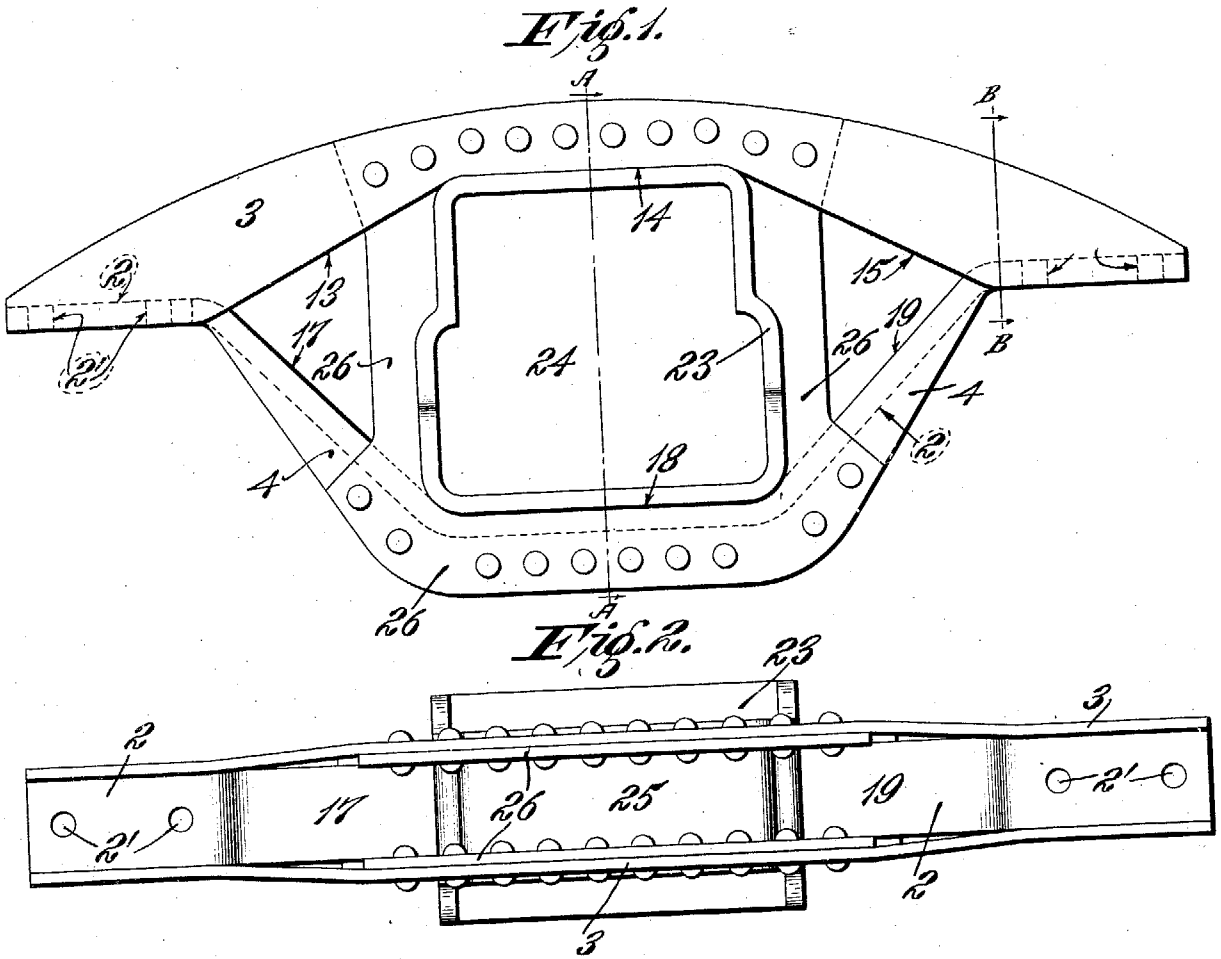
Witnesses:
Edgar T. Farmer
R. W. Preston
Inventor:
William D. Forsyth,
by Connett & Connett
his Attys.

W. D. FORSYTH.
FORGED CAR TRUCK SIDE FRAME AND METHOD OF MAKING SAME.
APPLICATION FILED MAR. 28, 1914.
Reissued June 23, 1914.
13,759.
3 SHEETS—SHEET 2.
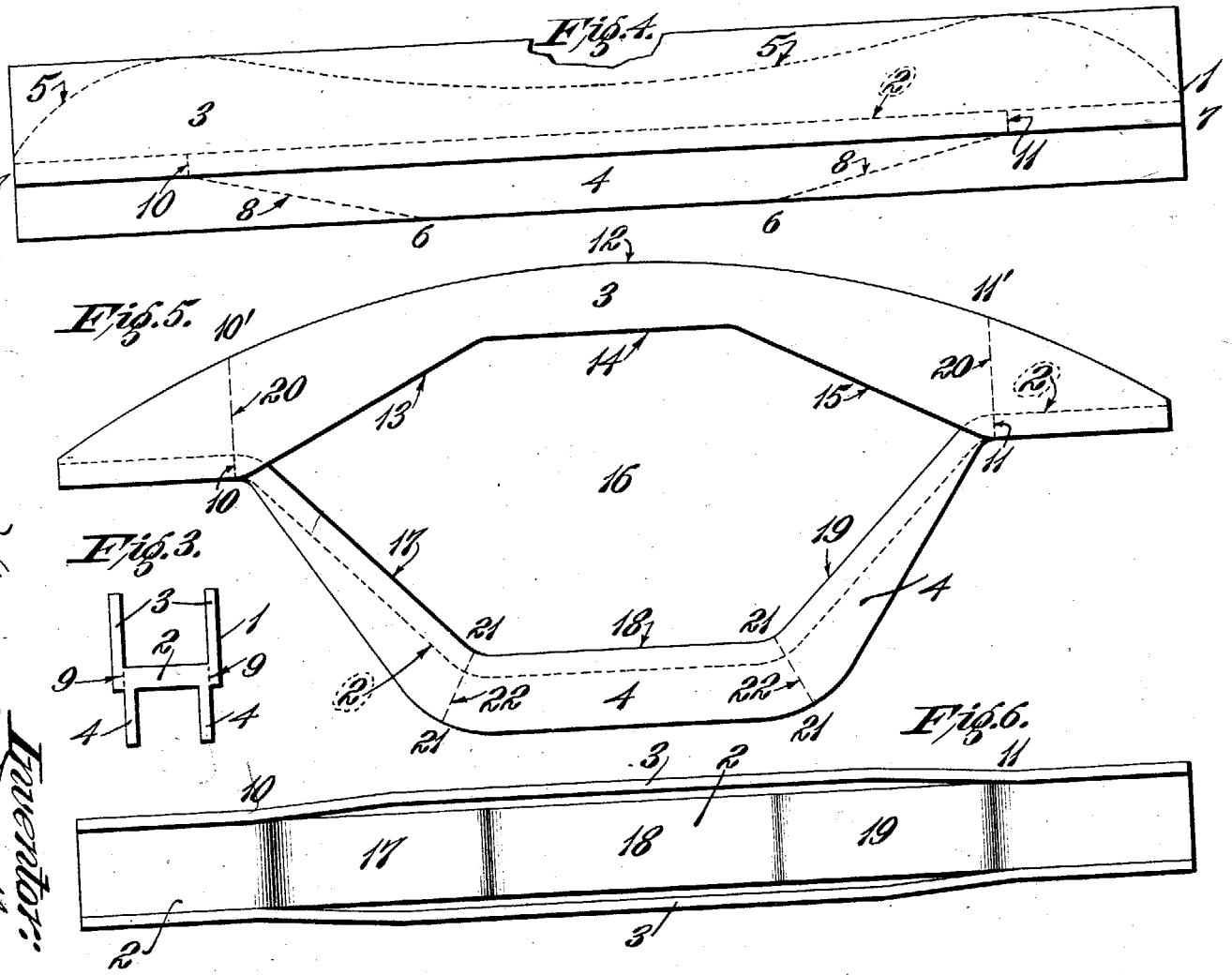
Witnesses:
Edgar T. Farmer.
H. W. Preston
Inventor:
William D. Forsyth,
by Connett & Connett,
his Attys.

W. D. FORSYTH.
FORGED CAR TRUCK SIDE FRAME AND METHOD OF MAKING SAME.
APPLICATION FILED MAR. 28, 1914.
Reissued June 23, 1914.
13,759.
3 SHEETS—SHEET 3.
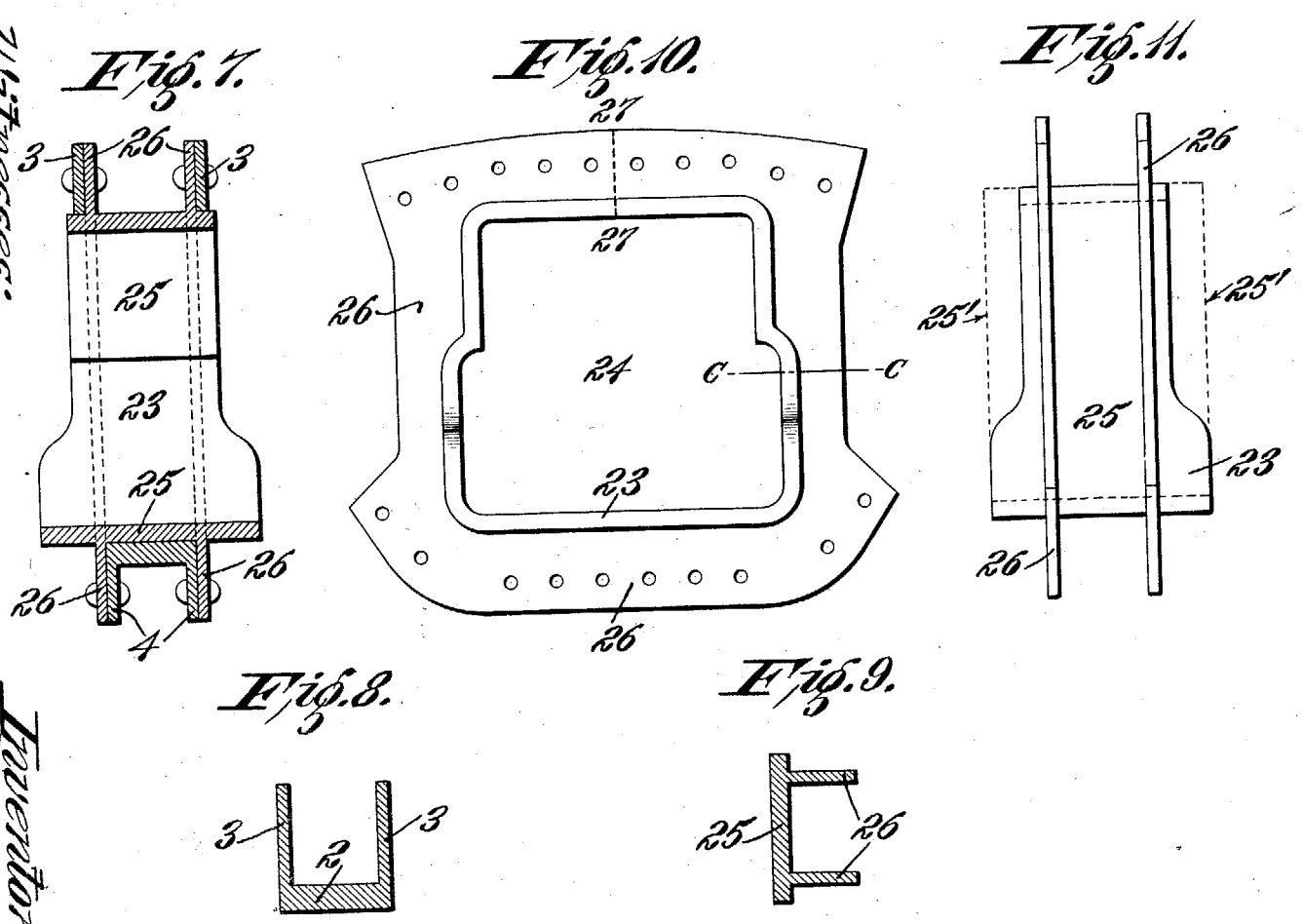
Witnesses:
Edgar T. Farmer
R. W. Preston
Inventor:
William D. Forsyth,
by Connett & Connett
his Attys.

UNITED STATES PATENT OFFICE.

WILLIAM D. FORSYTH, OF YOUNGSTOWN, OHIO, ASSIGNOR, BY MESNE ASSIGNMENTS, TO RAILWAY PRODUCTS CORPORATION, OF BUFFALO, NEW YORK, A CORPORATION OF NEW YORK.

FORGED CAR-TRUCK SIDE FRAME AND METHOD OF MAKING SAME.

13,759. Specification of Reissued Letters Patent. Reissued June 23, 1914.

Original No. 1,083,393, dated January 6, 1914, Serial No. 775,217. Application for reissue filed March 28, 1914. Serial No. 828,068.

*To all whom it may concern:*

Be it known that I, WILLIAM D. FORSYTH, a citizen of the United States, and a resident of Youngstown, in the county of Mahoning and State of Ohio, have invented new and useful Improvements in Forged Car-Truck Side Frames and Method of Making Same, of which the following is a specification.

My invention relates to forged car truck side frames.

The principal object of my invention is to provide a car truck side frame which is made of a simple structural shape of rolled, forged or pressed metal, and a method of making said frame.

My invention consists of a car truck side frame which is made from a structural shape of rolled, forged or pressed metal, and a method of making said frame. The car truck side frame made according to my invention comprises a compression member and a tension member integral with each other, and a truss member attached to the compression and tension members and shaped so as to provide a bolster opening. One of the novel and essential features of my invention is the distribution of metal in the members of the frame and their parts.

In the accompanying drawings, Figure 1 is a side view of a car truck side frame embodying my invention; Fig. 2 is a top plan view of the frame shown in Fig. 1; Fig. 3 is an end view of the structural shape from which the frame is made; Fig. 4 is a side view of the shape shown in Fig. 3, with dotted lines showing where this shape is sheared, a dotted horizontal line being used to indicate the top surface of the web of said shape; Fig. 5 is a side view of the frame after the shape shown in Figs. 3 and 4 has been slitted, bent and expanded; Fig. 6 is a top plan view of the frame shown in Fig. 5; Fig. 7 is a section on the line A—A of Fig. 1; Fig. 8 is a cross-section on the line B—B on Fig. 1; Fig. 9 is a cross-section on the line C—C on Fig. 10; Fig. 10 is a side view of the truss member forming a part of the completed car truck side frame; and Fig. 11 is an end view of the truss member shown in Fig. 10, with dotted lines showing the form of this member before its edges have parts cut away.

In the drawings, like reference characters refer to like parts throughout the several views.

For making the compression and tension members of the car truck side frame embodying my invention, a structural metal shape 1, as shown in Figs. 3 and 4 is employed. This structural metal shape 1 has a web 2, marginal flanges 3—3 and wings or fins 4—4. The flanges 3—3 are at the outer edges of the web 2 and extend therefrom substantially at right angles. The fins 4—4 extend from the web 2 substantially at right angles thereto in a direction opposite to the direction in which the flanges 3—3 extend, and are spaced from the edges so that their outside surfaces are substantially in the same plane as the inner surfaces of the flanges 3—3. The flanges 3—3 are sheared along the curved dotted line 5. The fins 4—4 are sheared at each end of the shape 1 between the points 6 and 7, along the dotted line 8 and the under side of the web 2. The web 2 is slitted by two parallel slits, each extending from a point 10 adjacent to one end of the structural shape 1 to a point 11 adjacent to the other end of said shape and placed to cut the web 2 between the inner surface of a flange 3 and the outer surface of the corresponding fin 4, as indicated by the dotted line 9 on Fig. 3. By thus slitting the structural shape 1 the web 2 is divided into three sections, two of these sections consisting of the two ends comprising that part of the web 2 having therein the journal box holes $2^1$, between the points 10 and 11 and the respective ends of said web, and the other section consisting of that portion of the web between the points 10 and 11, Figs. 5 and 6.

After the structural shape 1 has been slitted by any suitable form of apparatus, as hereinbefore described, the portions of the flanges 3—3 which are severed from the web 2 are bent and formed by pressing or forging so as to curve their outer edges 12 and shape their inner edges to form three straight portions 13, 14 and 15 angularly disposed to one another. The portion of the web 2 which is severed from the flanges 3—3 and its fins 4—4 is also formed and stretched to take the shape shown in Fig. 5 in which the severed portion of the web 2 has three straight portions 17, 18 and 19 angularly disposed to one another. The fins 4—4 now constitute flanges for the severed portion of the web 2, and along the opposite straight portions 17 and 19 these flanges formed by the fins 4—4 taper in width. The straight portions 13, 14 and 15 of the portions of the flanges 3—3 which are severed from the web 2 and the straight portions 17, 18 and 19 of the severed portion of the web 2 form the sides of a bolster opening 16 which is approximately hexagonal in shape.

The compression member of the completed car truck side frame is formed of the flanges 3—3 which are bent so as to have their outer edges 12—12 curved. The tension member of the frame is formed of that portion of the web 2 between the points 10 and 11 which was severed from the flanges 3—3 together with the fins 4—4 on said web 2. It will be noted that the greatest depth of metal in the compression member is along the dotted lines 20 between the points 10—10′ and 11—11′; and that the greatest depth of metal in the tension member is along the dotted lines 22 between the points 21—21. In expanding the structural shape 1 its flanges 3—3 have the portions of their lengths which are severed from the web 2 spread apart, as indicated in Figs. 2 and 6.

The truss member 23 of the frame is preferably made of a structural shape. This structural shape has a web 25 and two flanges 26—26 intermediate the edges of said web which are parallel to each other, as shown in solid lines and dotted lines $25^1$ in Fig. 11. This structural shape is bent transversely of its length to form a hollow frame, substantially rectangular in shape and having a bolster opening 24. The ends of the structural shape are brought together at a point near the middle of one side, as indicated by the dotted line 27—27 on Fig. 10. These abutting ends may be left separate or they may be welded or otherwise suitably fastened together. Part of each edge of the web 25 is cut away to make the top part of the truss member 23 narrower than the bottom part, as indicated in Figs. 7 and 11. The flanges 26 are cut away to leave the shape shown in Fig. 10. In bending the structural shape, the bolster opening 24 is made wider at the bottom than the top, as shown in Fig. 10. The flanges 26—26 are spaced apart so that they may be inserted between the flanges 3—3 of the compression member, as shown at the top of Fig. 7, and so that the web and flanges of the tension member will be included within said flanges 26—26, as shown at the bottom of Fig. 7. When said truss member has been inserted between said flanges 3—3 and the tension member of the frame has been inserted within its flanges 26—26, it is riveted in this position in any suitable way.

It will be noted that the web 25 of the truss member bridges, for a distance equal to the width of the truss member, the space between the flanges 3—3, forming part of the compression member of the frame and reinforcing the web of the tension member at the bottom of the frame.

Obviously, the construction shown and described admits of considerable modification without departing from my invention. Thus, while I have shown my invention as embodied in a car truck side frame, it is obvious that certain advantages of my invention may be attained when my invention is applied to other car parts.

What I claim as my invention is:

1. A car truck side frame made from a single piece of rolled, forged or pressed metal, comprising a web having flanges at its edges, and wings between its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape.

2. A car truck side frame made from a single piece of rolled, forged or pressed metal, comprising a web having flanges at its edges, and wings between its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof.

3. A car truck side frame made from a single piece of rolled, forged or pressed metal, comprising a web having flanges at its edges, and wings intermediate its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape, and a truss member attached to said compression member and said tension member.

4. A car truck side frame made from a single piece of rolled, forged or pressed metal, comprising a web having flanges at its edges, and wings between its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof, and a truss member attached to said compression member and said tension member.

5. A car truck side frame made from a single piece of rolled, forged or pressed metal, comprising a web having flanges at its edges, and wings between its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape, and a truss member attached to the inner sides of the flanges of the compression member and to the outer sides of the flanges of the tension member.

6. A car truck side frame made from a single piece of rolled, forged or pressed metal, comprising a web having flanges at its edges, and wings between its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape, said compression and tension members being bent and stretched so that the outer edges of said compression member are curves and its inner edges constitute three sides of the hexagonal opening of said frame; the top of the web of the tension member constituting the three remaining sides of said opening, and the wings of said web constituting the flanges of said tension member at the edges thereof, and a truss member attached to the inner side of the flanges of the compression member and to the outer sides of the flanges of the tension member.

7. A car truck side frame made from a rolled, forged or pressed metal structural shape, comprising a web having flanges at its edges on one side and wings between its edges on the other side, said shape being slitted longitudinally between its said flanges and being sheared and bent so that the outer edges shall be curves and their inner edges shall form three sides of the hexagonal opening in said frame; said wings being sheared at their ends and with said web being bent and stretched so that their inner edges and the top of said web shall form the three remaining sides of said hexagonal opening, and so that the ends of said structural shape shall extend at each end of said frame beyond said compression and tension members.

8. A car truck side frame made from a single piece of rolled, forged or pressed metal, comprising a web having flanges at its edges, and wings between its edges extending from said web in a direction opposite to the direction of said flanges, the compression member of said frame consisting of the ends of said web and the flanges thereof; the tension member thereof consisting of the remainder of said web and its wings, said members being formed so that the opening in said frame shall be approximately hexagonal in shape, a truss member centrally attached to said compression and tension members, and means at each end of said frame for attaching journal boxes thereto.

9. A car truck side frame made from a structural shape, comprising a web having parallel flanges extending from one side thereof, and parallel wings extending from the other side thereof; said web being slitted by parallel slits between said wings and flanges between its ends, and that portion of said flanges and of said web, between the ends of said slits, being bent and stretched in a direction at right angles to the plane of said web to form an opening in said frame for the reception of a truss member and ends for the attachment of journal boxes.

10. A car truck side frame made from a structural metal shape, comprising a web having parallel flanges extended from one side thereof, and parallel wings extending from the other side thereof; said web being slitted by parallel slits between said wings and flanges intermediate its ends, and that portion of said flanges and of said web, between the ends of said slits, being bent and stretched in a direction at right angles to the plane of said web to form an opening in said frame for the reception of a truss member and ends for the attachment of journal boxes and a truss member attached to the flanges forming the sides of said opening.

11. A car truck side frame made from a structural metal shape, comprising a web having parallel flanges extending from one side thereof, and parallel wings extending from the other side thereof; said web being slitted by parallel slits between said wings and flanges between its ends, and that portion of said flanges and of said web, between the ends of said slits, being bent and stretched in a direction at right angles to the plane of said web to form an opening in said frame for the reception of a truss member and ends for the attachment of journal boxes and a truss member attached to the flanges forming the sides of said opening and means to attach journal boxes at each end of said frame.

12. A car truck side frame made from a structural metal shape, comprising a web having parallel flanges extended from one side thereof, and parallel wings extending from the other side thereof; said web being slitted by parallel slits between said wings and flanges between its ends, and that portion of said flanges and of said web, between the ends of said slits, being bent and stretched in a direction at right angles to the plane of said web to form an opening in said frame for the reception of a truss member and ends for the attachment of journal boxes; and a truss member attached at its flanges to the inside of the flanges of the compression member and the outside of the flanges of the tension member.

13. A car truck side frame made from a structural metal shape, comprising a web having parallel flanges extended from one side thereof, and parallel wings extending from the other side thereof; said web being slitted by parallel slits between said wings and flanges between its ends, and that portion of said flanges and of said web, between the ends of said slits, being bent and stretched in a direction at right angles to the plane of said web to form an opening in said frame for the reception of a truss member and ends for the attachment of journal boxes; a truss member attached at its flanges to the inside of the flanges of the compression member and the outside of the flanges of the tension member and means at each end of said frame for the attachment of journal boxes.

14. A blank for making a car part formed of a structural shape and comprising a web extending longitudinally of said shape, parallel flanges integral with said web at the ends of said shape and having a portion separated from said web between the ends of said shape and fins integral with the severed portion of said web.

15. A blank for making a car part formed of a structural shape and comprising a web extending longitudinally of said shape, parallel flanges integral with said web at the ends of said shape and severed from said web between the ends of said shape, the edges of said flanges being cut away so that they curve toward the web at each end portion and at the middle portion, parallel fins integral with the severed portion of said web and being narrower at their ends than at a portion of their lengths between their ends.

16. A blank for making a car part formed of a structural shape and comprising a web extending longitudinally of said shape, parallel flanges and parallel fins integral with said web, said web having spaced slits therein for a portion of its length between its ends, said slits lying between said flanges and including between them said fins.

17. The method of making car parts which consists in making in the web of a structural shape parallel slits extending longitudinally and terminating short of the ends of said web, said web having two flanges and two fins integral therewith, said slits being located so as to lie between said flanges and to include said fins, and then displacing the portion of said web bordered by said slits in a direction substantially perpendicular to the plane of said web.

18. The method of making car parts which consists in making in the web of a structural shape parallel slits extending longitudinally and terminating short of the ends of said web, said web having spaced parallel flanges integral therewith and fins integral with said web and projecting therefrom in a direction opposite to the direction in which said flanges project, said slits being located so as to lie between said flanges and to include said fins, cutting away the edges of said flanges in such a manner that said flanges have their greatest cross-section at the ends of said slits, displacing the portion of said web bordered by said slits from the plane of the ends of said web in a line substantially perpendicular to said plane and simultaneously displacing said flanges away from said plane in a direction opposite to the direction in which said portion of said web is displaced.

19. The method of making car parts which consists in making in the web of a structural shape parallel slits extending longitudinally and terminating short of the ends of said web, said web having spaced parallel flanges integral therewith and fins integral with said web and projecting from said web in a direction opposite to the direction in which said flanges project, said slits being located so as to lie between said flanges and to include said fins, cutting away the edges of said flanges so that said flanges have their greatest cross-section at the ends of said slits, cutting away the edges of said fins so that each has its greatest cross-section in the region midway of its length, and displacing the portion of said web bordered by said slits in a direction substantially perpendicular to the plane of said web.

20. The method of making car parts which consists in cutting a metal blank to form two spaced strips integral for a portion of their length at each of their ends with the ends of a middle strip arranged between said first mentioned strips, said blank having spaced fins integral therewith which remain integral with said middle strip and form flanges thereon, and then displacing the middle portion of said middle strip perpendicularly away from the plane of the ends thereof.

21. The method of making car parts which consists in cutting a metal blank to form two spaced strips integral for a portion of their length at each of their ends with the ends of a middle strip arranged between said first mentioned strips, said blank having spaced fins integral therewith which remain integral with said middle strip and form flanges thereon, displacing the middle portion of said middle strip perpendicularly away from the plane of the ends thereof and spreading said strips slightly farther apart.

22. The method of making car parts which consists in cutting a metal blank to form two spaced strips integral for a portion of their length at each of their ends with the ends of a middle strip arranged between said strips, said blank having spaced fins integral therewith which remain integral with said middle strip and form flanges thereon, cutting the edges of said first-mentioned strips so that they have their greatest cross-section where they join said middle strip, and then displacing the middle portion of said middle strip perpendicularly away from the plane of the ends thereof.

23. A car part made from a single piece of metal and comprising a member formed of two spaced strips decreasing in cross-section from their end portions toward their between portions, and a second member formed of a flanged strip made integral with said strips at each of their end portions and bent away from said strips.

24. A car truck side frame made from a single piece of metal and comprising two spaced strips tapering in width from their end portions toward their middle portions, said strips being bent away from the plane of their end portions and being spread apart at their middle portions, and a channel-shaped member integral with said end portions of said strips and bent away from the plane of said end portions, the flanges of said channel-shaped member tapering in width from a middle portion to a point adjacent to said end portions of said strips.

25. A car truck side frame made from a single piece of metal and comprising two spaced compression members and a tension member, said compression members and said tension members being integral at their ends and bent away from each other, and a truss member formed of a structural shape bent into a substantially rectangular shape and having a web and two ribs, said ribs of said truss member being secured to said compression members and said tension member.

26. A car truck side frame made from a single piece of metal and comprising two spaced strips integral at their end portions with a flanged strip, said strips and said flanged strip being bent away from each other to form a substantially hexagonal opening, said flanged strip being of uniform width and having each of said flanges thereon tapering in width from a region midway of its ends to the points where said flanged strip meets the end portions of said strips.

27. A car truck side frame made from a single piece of metal and comprising spaced strips integral at their ends with a flanged strip, said strips and said flanged strip being bent away from each other, said strips being separated from each other a distance greater than the width of said flanged strip, and a truss member having spaced parallel flanges, said truss member extending between said strips and said flanged strip and being fastened thereto with its flanges in contact with the inside faces of said strips and with the outside edges of said flanged strip.

28. A car part made from a single piece of metal and comprising two spaced strips having their cross-sectional area decreasing from their end portions toward their middle portions, and a second strip integral with said strips at their end portions and having its middle portion spaced from the middle portions of said strips, said second strip having its cross-sectional area decreasing from its middle portion toward its ends.

29. A car part made from a single piece of metal and comprising two spaced strips integral at their end portions with a second strip having its center portions spaced from the middle portions of said strips, said second strip having its cross-sectional area decreasing from its middle portion toward its ends.

30. A car part made from a single piece of metal into the form of a truss and comprising a compression member having its cross-sectional area decreasing from its end portions toward its middle portion and a tension member integral at its ends with the end portions of said compression member, said tension member having its cross-sectional area decreasing from its middle portion toward its ends.

31. A car part made from a single piece of metal and comprising two spaced strips having their cross-sectional area decreasing from their end portions toward their middle portions, and a flanged strip made integral with said end portions of said strips and bent away from the plane of said end portions, the cross-sectional area of each of said flanges of said flanged strip decreasing from a portion at its middle to points adjacent to said end portions of said strips.

32. A car part made from a single piece of metal and comprising two spaced strips integral at their end portions with a flanged strip, said flanged strip being of uniform width and having each of said flanges thereof decreasing in width from a portion at its middle to points adjacent to said end portions.

33. A car part made from a single piece of metal and comprising two members spread apart at their middles and integral for a portion of their lengths at each end, one of said members having its greatest cross-section at the point where said members join.

34. A car part made from a single piece of metal and comprising two members spread apart at their middles and integral for a portion of their lengths at each end, one of said members having its greatest cross-section at the point where said members join, and the other of said members having its greatest cross-section in the region midway of its length.

Signed at St. Louis, Missouri, this 21st day of March, 1914.

WILLIAM D. FORSYTH.

Witnesses:
NEIL D. PRESTON,
ANDREW KESSLING.